United States Patent

Cooper

[15] 3,690,600

[45] Sept. 12, 1972

[54] ROTATING VARIABLE NOSE

[72] Inventor: Clifford B. Cooper, Fort Worth, Tex.

[73] Assignee: General Dynamics Corporation, Fort Worth, Tex.

[22] Filed: Nov. 24, 1970

[21] Appl. No.: 92,362

[52] U.S. Cl. ................................................244/120
[51] Int. Cl. ...........................B64c 1/00, B64c 1/28
[58] Field of Search ...............244/120, 121; 285/181

[56] References Cited

UNITED STATES PATENTS 3,171,620   3/1965   Walley et al................244/120
3,433,439   3/1969   Brame et al................244/121

Primary Examiner—Andrew H. Farrell
Attorney—Charles C. M. Woodward

[57] ABSTRACT

An aircraft having a geometrical means for revolving the nose portion thereof about an axis oblique to the normal centerline of the vehicle, resulting in a pitch-down, nonfaired configuration to increase clear field of vision in the critical area lying below and ahead of the aircraft for landing and takeoff while in one position, and an optimum aerodynamically acceptable supersonic configuration in the other position.

8 Claims, 13 Drawing Figures

PATENTED SEP 12 1972

INVENTOR
CLIFFORD B. COOPER
BY
Charles E. Woodward
ATTORNEY

INVENTOR
CLIFFORD B. COOPER
ATTORNEY

ROTATING VARIABLE NOSE

This invention relates generally to high speed space re-entry vehicles, shuttle-craft, and aircraft, and more specifically to supersonic aircraft wherein it is desirable to provide an optimum aerodynamic shape for high speed flight, while at the same time providing for maximum visibility during those portions of the flight envelope which are at relatively slow speeds, or during which maximum visibility for crew members is desirable, such as landing and takeoff regimes.

Although in the past much attention has been given to attempts to optimize high speed aircraft configurations, almost all have had to compromise these configurations in order to provide a reasonable capability for operation of the aircraft in other regimes. Of particular interest recently has been the effort generated in providing a reasonable field of view forward and down from a supersonic aircraft configuration during that portion of its flight envelope occasioned by landing and/or takeoff, or associated therewith.

These prior efforts may be generally characterized as of two types, the first being a structural compromise between characteristics and requirements of the high speed low speed configuration, and the second being a reconfiguration of the fuselage generally forward of the crew compartment.

The former are exemplified by U.S. Pat. No. 2,736,523 to H. E. Chaplin, wherein the crew compartment and nose of the aircraft are pivoted at the lower portion of the fuselage and "droop" from that point, and U.S. Pat. No. 3,334,846 to W. A. Spivak et al., wherein a secondary windscreen is slideably positioned from a point above the crew compartment to a point lying along the nose. The former thus realizes an increased "over the nose" view on actuation, the latter a better high speed configuration aerodynamically.

The second type are similar to the above Chaplin patent, except that the crew compartment does not pivot, although the pivot point at which the nose rotates downwardly is, of necessity, structurally integral with that portion of the fuselage aft of the nose and contiguous to the crew station, such structure exemplified by U.S. Pat. No. 3,433,439 to Brame et al.; U.S. Pat. No. 3,331,570 to Kinnseley et al.; U.S. Pat. No. 3,114,525 to Morgan et al.; U.S. Pat. No. 2,778,586 to Nyerges et al., and others.

The present invention accomplishes these and other advantages by mounting the nose section forward of the crew station so that on rotation thereof the nose is either drooped for high over-the-nose visibility or configured for high speed flight.

It is therefore an object of the present invention to provide a means whereby improved visibility is obtained for low speed flight of high speed aircraft.

It is a further object to provide a mechanical means for a droop nose aircraft maintaining maximum structural integrity and simplicity.

A further object is the provision of increased visibility in the low speed regimes of supersonic and high speed aircraft with a minimum of auxiliary systems interference.

It is a further object to provide means for optimizing aerodynamic design of an aircraft for supersonic flight.

A further object is the provision of a simple geometry and associated mechanical means of altering an aircraft nose configuration.

A further object is the provision of a windshield having an extremely low angle of incidence to minimize the thickness thereof, save weight, and obviate glass damage from objects encountered in high speed, relatively low level flight.

A further objective is the provision of an optimum closed curtain-type cockpit environment inherently capable of incorporating a heretofore not possible display area for presenting additional optical and electronic information and indirect visual aids in a structurally integral crew compartment for military and other high performance aircraft of space vehicles.

A further objective is the provision of improved structural integrity and aerodynamic criteria in all regimes of a flight envelope for high speed aircraft.

A further objective is the provision of a droop nose aerodynamic vehicle providing for full and efficient utilization of the forward or nose section through structural integrity and continuity and a minimum of nose-down actuation systems or structure, and the consequent effective utilization of the structural envelope defined thereby.

These and other objects and advantages of the invention will be apparent to those skilled in the art when taken in conjunction with the following specification and drawings, wherein.

Figure 1:
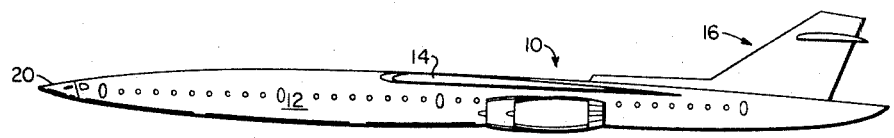
FIG. 1 is a simplified side view of an aircraft embodying the present invention, with the nose portion in the cruise or high speed configuration.
Figure 2:
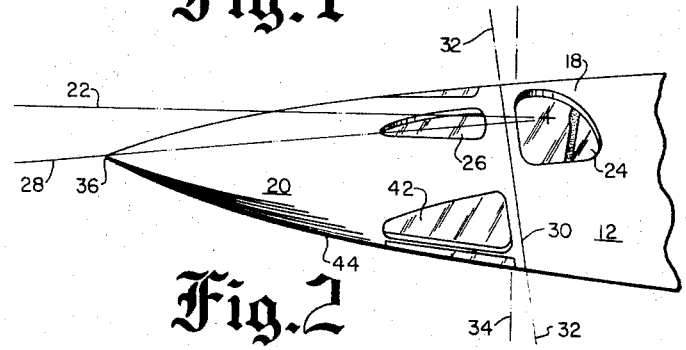
FIG. 2 is an enlarged side view of the forward portion of the aircraft of FIG. 1.
Figure 3:
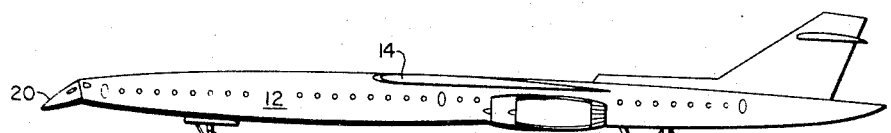
FIG. 3 is a side view similar to FIG. 1, showing the aircraft in the nose down configuration.
Figure 6:
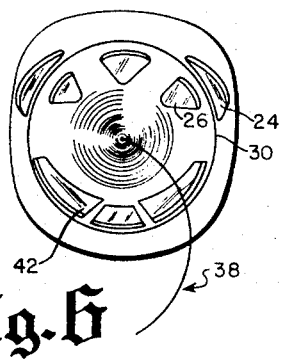
FIG. 6 is a partial front view of the configuration of FIGS. 1 and 2.
Figure 4:
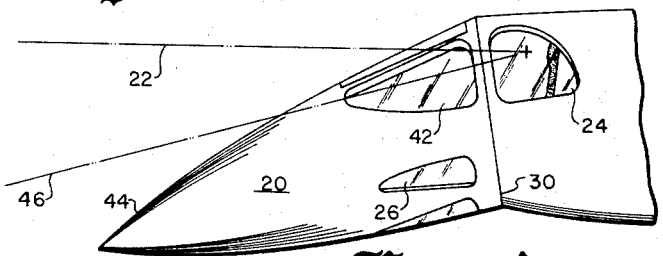
FIG. 4 is an enlarged side elevational view of the forward portion of the aircraft configuration of FIG. 3.
Figure 7:
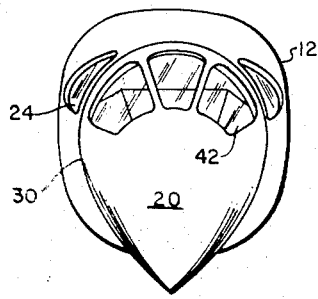
FIG. 7 is a partial front view of the configuration of FIGS. 3 and 4.
Figure 5:
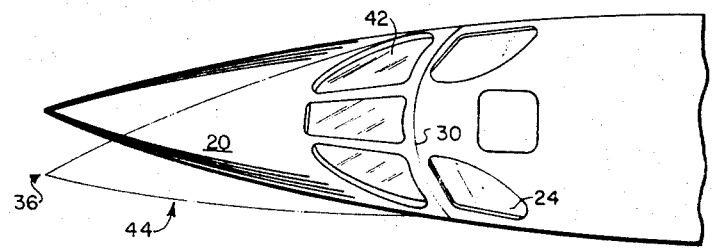
FIG. 5 is a view of the configuration of FIGS. 3 and 4, showing the aircraft from above.

Referring first to FIGS. 1 and 2, an aircraft designated generally by the reference numeral 10 and comprising a fuselage 12, wings 14 which may be variable incidence sweep wings as taught in U.S. Pat. No. 3,529,790 by E. H. Buck and assigned to the same assignee, control surfaces 16, crew compartment 18, FIG. 2, and a nose section or cone 20. Aircraft 10 has a forward reference vision line 22, FIG. 2, which is established by the crew positioning and angle of incidence of fixed windshields 24 and is determined by the contour of portion 18 of fuselage 12. In this configuration the relationship of high speed windshield 26 in nose section 20 determines the forward "down" vision line 28. Fuselage 12 and nose cone 20 are joined at 30 along rotational plane 32 which is inclined from the vertical plane 34. Referring now also to FIGS. 5, 6 and 7, since the rotational plane 32 is inclined from the perpendicular 34, rotation of nose section 20 causes nose cone point or apex 36 to describe an arcuate path 38, FIG. 6, when viewed head-on and rotated 180 degrees from the position shown in FIG. 6 (corresponding to FIGS. 1 and 2), through the intermediate position in phantom in FIG. 5 having a slight rotational side displacement 40, to the low speed position of FIGS. 3, 4 and 7. In this configuration, the nose section 20 is no longer faired and droops, windshields 42 have rotated to their operational position, and due to the increased slope of the long side 44 of nose section 20, a new forward-down vision line 46 (best shown in FIG. 4) is established. It is obvious that any momentary aerodynamic instability occasion by the side displacement 40 of the nose section 20, FIG. 5, during transition from the high to low speed configuration is minimal, and is readily damped out either automatically or manually by well known flight control means.

As is readily apparent from the above, the structure and operational mechanism of the present invention is simple, relatively inexpensive and of minimum weight, while providing easy maintenance and maximum efficiency for overall aircraft design. It achieves optimum characteristics for either high speed-maximum aerodynamic configuration or low speed-high visibility configuration.

It will also be readily apparent to those skilled in the art that the degree of visibility or down vision line (28, 46) is a function of the configuration of nose section 20, shape and placement of windshield 42, and angle of the rotational plane 32 relative to fuselage 12 and nose section 20.

Figure 8:
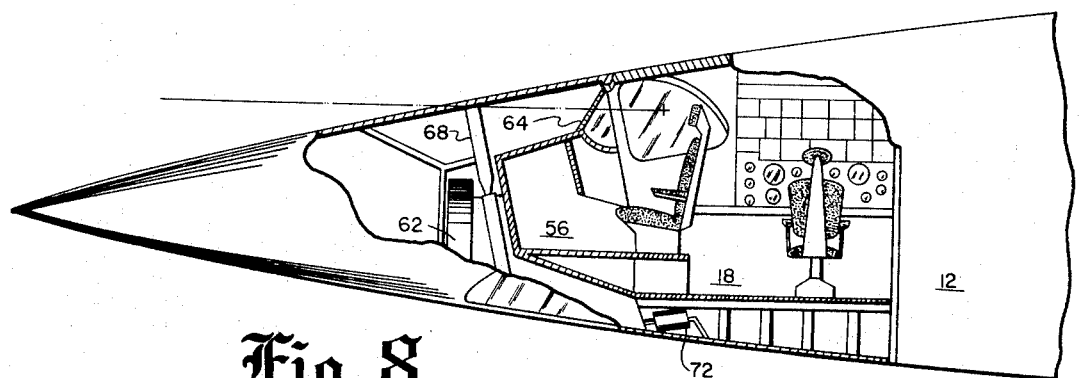
FIGS. 8 and 9 are side elevational views, partially in section, and phantom showing the mechanical and structural configuration of the nose and fuselage-crew compartment portions of an aircraft incorporating the present invention in both high speed and low speed configurations respectively.
Figure 9:
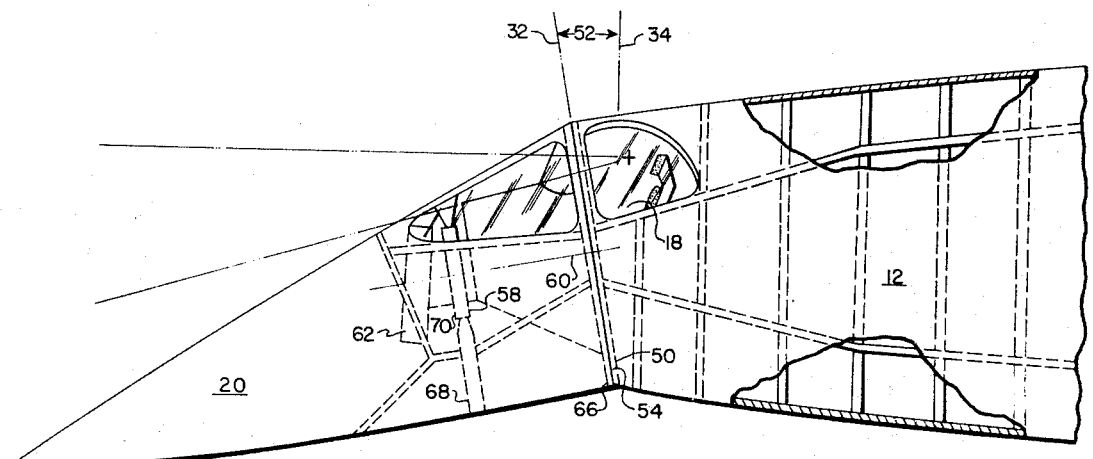

Referring now to FIGS. 8 and 9, a breakaway and phantomed drawing is illustrative of the configuration and structure of an aircraft embodying the invention. Fuselage 12 is provided with a bulkhead 50, FIG. 9, which defines an angle 52, relative to vertical plane 34, establishing rotational plane 32. Bulkhead 50 preferably forms or encompasses an aft fuselage inner bearing race 54. Extended forward from this station may be a portion 56 of the pressurized cabin or crew compartment 18, a portion of which may form a forward fuselage inner bearing race 58, FIG. 9. The rotational axis 60 of nose cone 20 is also best shown in FIG. 9, and as is obvious relative thereto, radar sensor 62 and/or other sensing or searching electronic or flight equipment, normally rigidly attached to the main body of fuselage 12, is permitted to maintain its proper alignment and bore sighting without interference with or from the rotatable nose section 20, regardless of position of the latter. High performance military aircraft may be provided with the forward pressure window 64 shown in FIG. 8 as an integral component of an escape module illustrated in FIGS. 12 and 13 hereinafter.

Nose section 20 is seen to comprise a structural member 66 mating with bulkhead 50 of fuselage 12, and may form an outer bearing race. Nose section bulkhead 68 may encompass or include nose cone forward outer bearing race 70, coinciding with inner bearing race 58 of fuselage 12. The rotational motive means may obviously be operatively attached at either the forward or aft positions of the bearings, and on either the nose or fuselage. FIG. 8 illustrates schematically a small drive motor 72 attached at aft fuselage inner bearing race 54 of fuselage 12.

Figure 10:
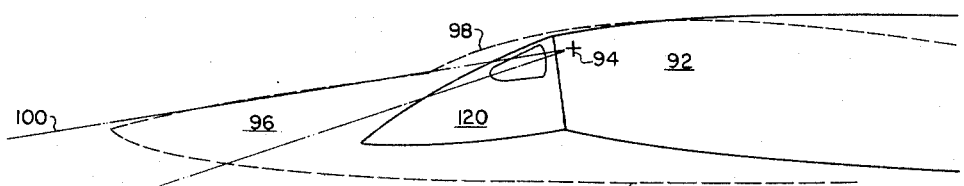
FIG. 10 is illustrative of some of the visual, structural and aerodynamic advantages derived from the present invention over state of the art aircraft.
Figure 11:
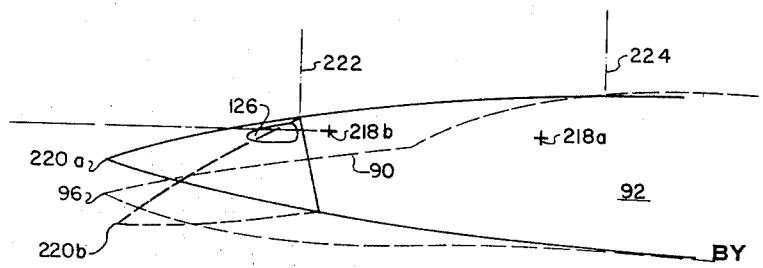
FIG. 11 is similar to FIG. 10 but shows an optimum configuration achievable by the present invention.

FIGS. 10 and 11 are illustrative of some of the visual, structural and aerodynamic advantages particularly as applicable to high performance aircraft derived from or obtainable by employment of the present invention in comparison with present state-of-the-art supersonic aircraft.

As readily apparent in FIG. 10, a conventional aircraft 90 (shown in phantom) having fuselage 92, pilot's eye position 94 and nose section 96 is aerodynamically a compromise between acceptable high-speed and low-speed configurations, the fuselage "bulge" created by the necessity of an acceptable "down" position vision wind shield 98, as indicated by line-of-sight 100, imposing an obvious aerodynamic penalty on the aircraft during high speed flight regimes. Additionally, if such high speed flight is low level, the potential for windshield breakage from striking birds is seen to be materially higher in such state of the art configuration than in that incorporating the present invention (in solid line) wherein the high speed nose section 220a (best shown in FIG. 11) has an optimum aerodynamic configuration which includes the windshield 126. Obviously windshield 126 of FIG. 11 has a materially smaller angle of incidence that conventional windshield 98, FIG. 10. As will also be apparent from FIGS. 10 and 11, with the rotating nose of the present invention in the low speed configuration designated by 120 in FIG. 10 and 220b in FIG. 11, a materially better "down" vision 146 is provided than in conventional aircraft 90 shown at 100, while at the same time permitting optimum aerodynamic shape and safety for high speed flight when nose is in the position designated 220a as shown in FIG. 11.

Having reference specifically to FIG. 11, an optimum configuration utilizing the present invention is shown therein superimposed station for station on the state of the art aircraft shown in FIG. 10. Proper arrangement of the crew station, nose, and other components permitted by the invention will permit a more forward positioning of the pilot and crew station 218b relative to the crew station 218a of the state of the art aircraft within the aerodynamic lines and configuration of the "common" aircraft fuselage 92, thus obtaining a much shorter moveable nose section 220 as related to other prior configurations. This has the obvious advantages—in addition to those previously noted—of reducing overall aircraft weight, less nose weight and thus reduced structure and mechanism, less aerodynamic flight load on the nose structure and reduced aerodynamic instability during transition from one configuration to another. As will also be apparent from FIG. 11, the present invention permits a more efficient utilization of aircraft structure, more latitude and flexibility in the design of the aircraft nose section 220 and components—and their arrangement since the area immediately aft of the crew compartment 218b between stations designated 222, 224 is of a greater volume per given length as defined within the optimum aerodynamic lines relative to the conventional aircraft volume forward of crew station 218a.

Figure 12:
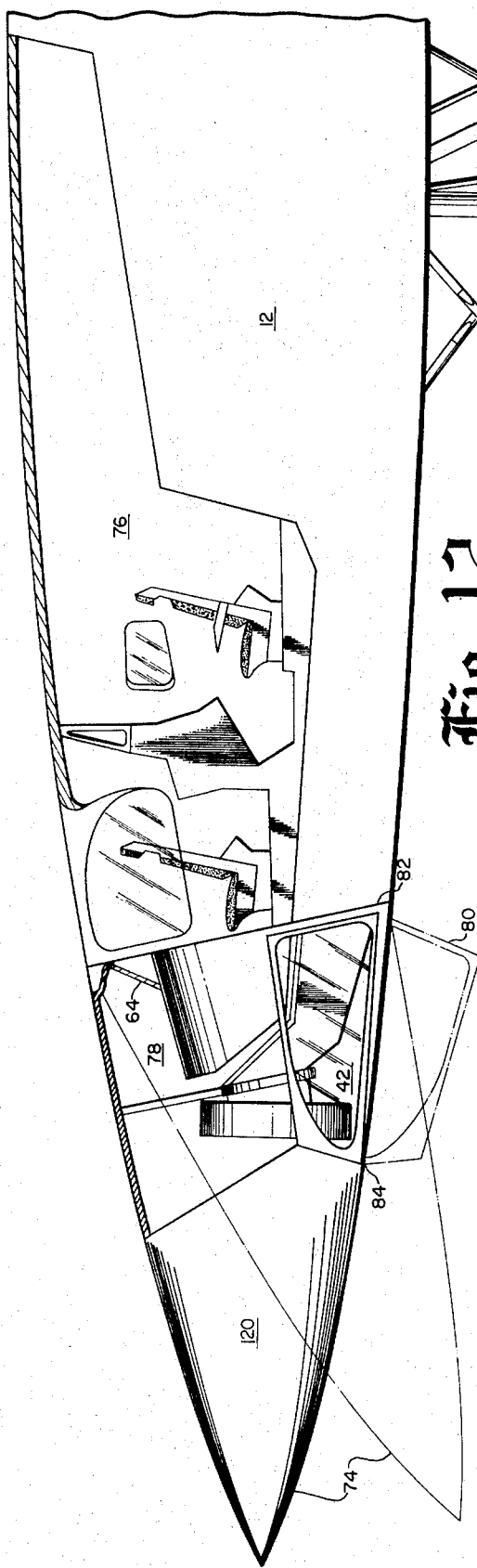
FIG. 12 is a side elevational view, partially in section, illustrative of improved state of the art features for military aircraft and other high performance vehicles enhanced by the present invention.

FIG. 12 is a side elevational view partially in section, illustrative of some improved state of the art features for use in military aircraft or any other high performance vehicles. As shown it demonstrates a combined integral design of the variable nose high speed-low speed profile 74, high and low speed crew escape module 76, closed curtain environment 78 with increased visual display area for the pilot, and a means of permitting easy windshield cleaning and maintenance access to the forward nose section components. As shown, panel 80 in nose portion 120 contains windshield 42, which may readily be removable or hinged about the attach points 82, 84. Access to the upper portion of the escape module 76 may be accomplished in the same manner when the nose is positioned in the drooped or low speed position. A quick-acting, multi-fastener locking system such as that shown in detail in the G. W. Koonce U.S. Pat. No. 3,508,305 is preferred for a panel of this type since access thereto from outside the aircraft is quick and simple. Obviously, the same type of system may be employed with other panels requiring both load bearing capability and ready removal.

It will be readily apparent from the above to those skilled in the art that the present invention is ideally suited to obtain in the simplest manner a "closed curtain" environment to protect the crew from thermonuclear flash effects. This is best accomplished by deletion of high speed windshields (such as shown at 126 in FIG. 11 for example) so that, with nose section 120 in the supersonic flight position, an optimum closure of the forward area 78 is obtained. Obviously, deletion of these windshields would necessitate an instrument flight operation at any time the nose is in the high speed position. Conversely, if vision is desired regardless of the nose configuration, due to the relatively simple, pressure windshield 64 and smooth lines of nose section 120 resultant from the invention, flash curtains conforming to this configuration may readily be employed in a number of ways, providing flexibility.

Figure 13:
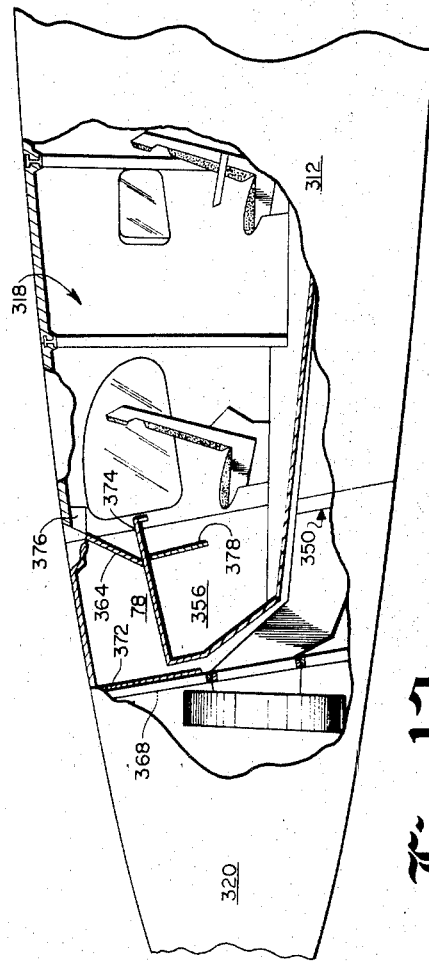
FIG. 13 is a partial sectional elevational representation of an improved heads-up display or other type optical or electronic display made possible by the invention.

The present invention also has the inherent advantage of providing an optimum "heads-up" display or other additional optical and electronic information and indirect visual aids for supersonic configuration as an integral and shared function of the invented structure. This is best illustrated by FIG. 13, which shows the forward portion of an aircraft incorporating the rotatable nose of the invention. As shown, fuselage 312 includes crew compartment 318, a portion 356 of which extends forward of bulkhead 350 (which comprises the aft fuselage inner bearing race 54 and nose section aft outer bearing race 66 as explained relative to FIG. 9), to bulkhead 368 (a portion of which comprises the inner and outer bearing races 58, 70 of the fuselage forward bearing and the nose cone forward bearing respectively of FIG. 9), the nose section 320 rotating about the two bulkheads as above explained. The high speed or closed curtain portion of bulkhead 368 may have a screen 372 attached to or integrally incorporated therein so that it extends in front of and above glare shield 374, and receives an image from projection device 376, which may be positioned in proximity to forward pressure window 364. The faired lines of the high speed configuration thus produce a large bulkhead surface immediately forward of the instrument panel envelope and in good viewing perspective of the pilot. This permits a long, forward looking display which is large enough to receive flight situation displays consistent with the usually accustomed direct vision over glare shield 374, while materially simplifying structure, optics, etc. When in the high visibility configuration (nose drooped), the screen 372 is obviously moved out of the way through the rotation of the nose structure. This is, of course, in addition to—i.e., supplementary to—the usual instrumented displays normally located on forward instrument panel 378 or other usual heads-up visually displayed information. It will be obvious to those skilled in the art that any number of combination of display projection techniques or electronic display devices may be employed, examples of which include high resolution, multiple-channel cathode ray tube systems enabling high fidelity over the entire field of view, full-color laser display systems which have very wide fields of view, periscopes, reflective and refractive virtual image displays utilizing nonglass and fiber optics, wide-angle infinite depth-of-field optical probes, etc., to name just a few state-of-the-art devices presently employed.

Thus, it will be apparent that the present invention provides a means, completely consonant with present aircraft structure, for providing for both optimal visual capability in flight regimes wherein such capability is required, as well as enabling optimum aerodynamic characteristics for high speed flight regimes, yet doing so by employing structure inherent basically in any aircraft designed in accordance with the invention. The means employed is relatively simple structurally and mechanically, and obviates almost entirely the shortcomings and objections of prior art methods. It permits optimum aerodynamic design for high speed regimes, weight savings, and greater latitude in crew station and aircraft design over heretofore known methods, and other ancillary benefits.

I claim:

1. A flight vehicle having means for revolving a portion of said vehicle about an axis which is oblique to the centerline of said vehicle to thereby cause said portion to assume an attitude angled relative to the remainder of said vehicle.

2. A flight vehicle having at least first and second portions, a normal vehicle centerline, and means for revolving said second portion about an axis extending obliquely forward and downward from said vehicle centerline, thereby causing said second portion on axial rotation to assume a pitchdown configuration relative to said first portion.

3. The vehicle defined by claim 2 wherein said means comprises:
   A. first bearing means integrally attached to said first portion as part of the structure thereof, said first bearing means having an angular relationship to a vertical plane passing through said first portion normal to said centerline,
   B. second bearing means integrally attached to said second portion as part of the structure thereof, said second bearing means having the same angular relationship to the vertical plane passing through said first portion normal to said centerline as said first bearing means, and coinciding and moveably rotatably mateable therewith, whereby said bearing surfaces establish a rotational axis for said second portion which is oblique to said centerline and defined by the relationship of said bearing surfaces to each other and to said portions to which they are attached, rotational movement of said second portion bearing surface relative to said first portion bearing surface dictating a change in pitchdown of said second portion relative to said first portion.

4. The vehicle defined by claim 2 wherein:
A. said first portion comprises a fuselage having guidance and control surfaces attached thereto, a crew compartment, and a structural bulkhead member inclined forwardly from the bottom to the top of said fuselage to establish a nose cone rotational axis angled relative to said vehicle centerline, said bulkhead defining a joining and bearing means for reception of a nose cone portion,
B. said second portion comprises a nose cone having a structural bulkhead adjacent the aft end thereof, said nose cone bulkhead inclined forwardly from bottom to top relative to said nose cone, said nose cone having one side longer than the other side said bulkhead moveably rotatably attached to and receivable on said fuselage bulkhead, said bulkheads angular relationship to the vertical defining a nose cone rotational axis oblique to said vehicle centerline so that said nose cone centerline substantially coincides with said fuselage centerline and said nose cone surfaces are aerodynamically faired relative to the fuselage surfaces in a first flight position, and in a second flight position said nose cone centerline substantially coincides with said nose cone rotational axis and the surfaces thereof are not aerodynamically faired with the fuselage surfaces.

5. The vehicle defined by claim 2 wherein:
A. said first portion comprises
   1. a fuselage having control and guidance means attached thereto,
      a. said fuselage having a substantially circular cross-section on at least the forward portion thereof,
      b. said fuselage outer surface having a contour on the forward portion thereof establishing a given angle of incidence at any specific point thereof, said fuselage outer surface having a windshield therein conforming to said fuselage contour-established angle of incidence and determining a forward reference vision line,
   2. fuselage bearing and attachment means comprising fuselage bulkhead means positioned on the forward end of said fuselage,
      a. said bulkhead means inclined forwardly with respect to a vertical plane passing through the cross-section of said fuselage normal and at a right angle to said fuselage centerline, said bulkhead means adapted to function as a bearing and attachment means for said second portion and operative to establish a rotational axis for said second portion which is oblique to said fuselage centerline,
B. said second portion comprises a substantially cone shaped nose member having a base which defines an angle oblique to a plane passing vertically through the cross-section of said cone normal and at right angles to the centerline of said nose member,
   1. said nose member having a surface contour aerodynamically faired into said fuselage forward contour, one side of said nose member thus having a greater length than the other side,
   2. nose member bearing and attachment means comprising nose member bulkhead means positioned in said nose member at least substantially adjacent the aft end thereof and parallel to said nose member base,
      said bearing and attachment means in cooperative mating relationship with said fuselage bulkhead means so as to be rotationally movably attached thereto,
      said bearing and attachment means establishing an axis of rotation for said nose member which is oblique to said fuselage centerline, the point of said nose member describing an arcuate path when said member is rotated 180° and establishing a second down vision line relative to the droop of said nose member dictated by said nose member oblique axis of rotation; and
C. means attached to one of said first or second portions operative to cause relative rotational movement between said portions.

6. The vehicle defined by claim 5 wherein:
A. said fuselage bearing and attachment means comprises
   1. an aft fuselage bulkhead positioned in said fuselage substantially adjacent the forward end of said fuselage, said bulkhead forming an aft fuselage bearing,
   2. a forward fuselage bearing in cooperative operational relationship with said aft fuselage bearing,
B. said nose member bearing and attachment means comprises
   1. an aft nose member bulkhead positioned substantially adjacent the aft end of said nose member and defining an aft nose member bearing in operative relationship with said aft fuselage bearing,
   2. a forward nose member bulkhead positioned in said nose member and defining a forward nose member bearing in operative relationship with said forward fuselage bearing.

7. The vehicle defined by claim 2 wherein:
A. said means for revolving said second portion relative to said first portion comprises
   1. first and second bulkhead members attached to and forming structural components of said first portion,
      a. said second bulkhead member displaced forwardly from said first bulkhead member and substantially parallel thereto,
      b. said bulkheads defining at least in part bearing surfaces in operative relationship with cooperative bearing surfaces in said second portion, c. said first bearing surface defining a segment of a circle which is inclined from the perpendicular to, and whose center lies along, said vehicle centerline, d. said second bearing surface defining a segment of a circle which is inclined from the perpendicular to, and whose center lies along, said vehicle centerline, 2. first and second bulkhead members attached to and forming structural components of said second portion, a. said second bulkhead member displaced forwardly from said first bulkhead member and substantially parallel thereto, b. said bulkheads defining at least in part bearing surfaces in operative relationship with said first portion bearing surfaces, c. said first bearing surface defining a segment of a circle having a center lying on said vehicle centerline and inclined from the perpendicular thereto, d. said second bearing surface defining a segment of a circle inclined from the perpendicular to said vehicle centerline and the center of which, relative to said second portion first bulkhead member, is variable to said centerline and establishes an axis of rotation of said second portion oblique to said centerline.

8. The vehicle defined in claim 7 wherein:

said second portion second bearing surface is eccentrically located within said second portion whereby rotation of said second portion to one position, positions the large segment of said second bulkhead member in front of a crew compartment, said second bulkhead member incorporating information display means thereon whereby said display means is automatically positioned in viewing relationship to the crew compartment.

* * * * *